3,402,106
PRODUCTION OF FRESH WATER FROM
SALT WATER
Claude L. Spray, 40—40 203rd St.,
Bayside, N.Y. 11361
Filed Mar. 31, 1966, Ser. No. 545,191
9 Claims. (Cl. 202—174)

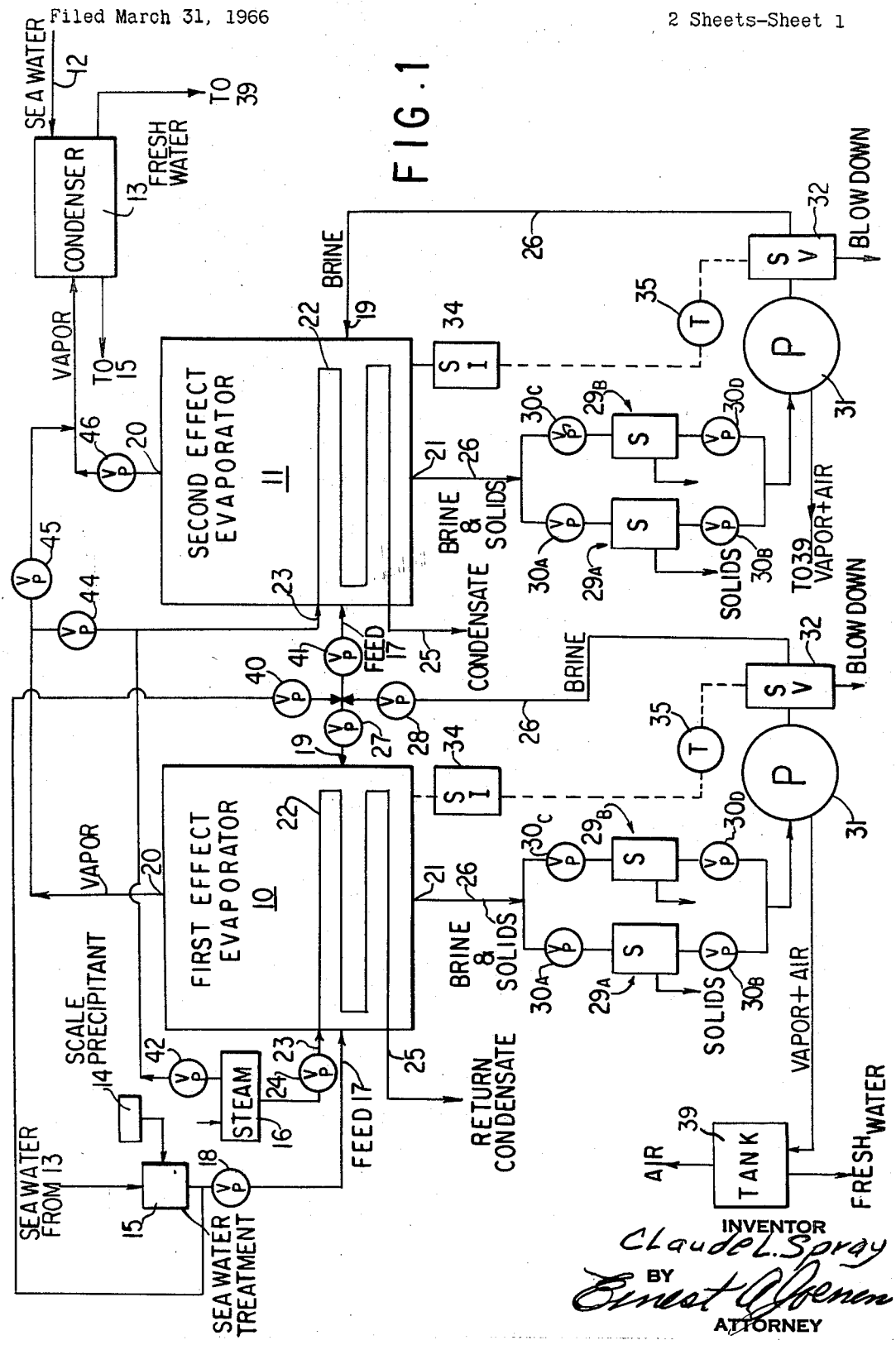

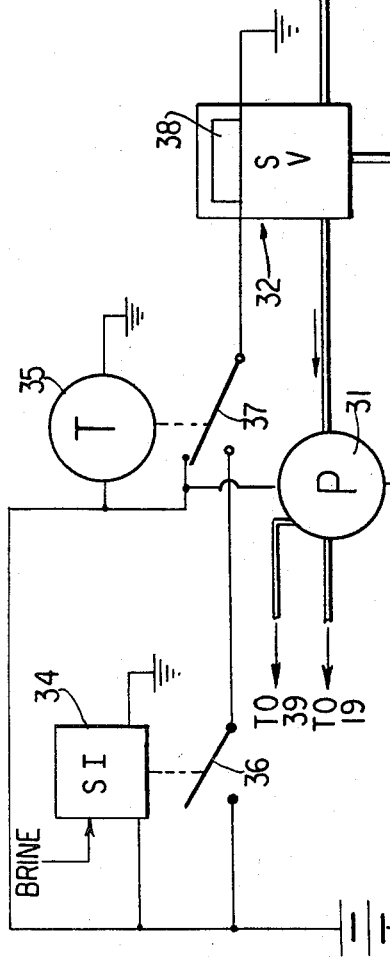
FIG. 4
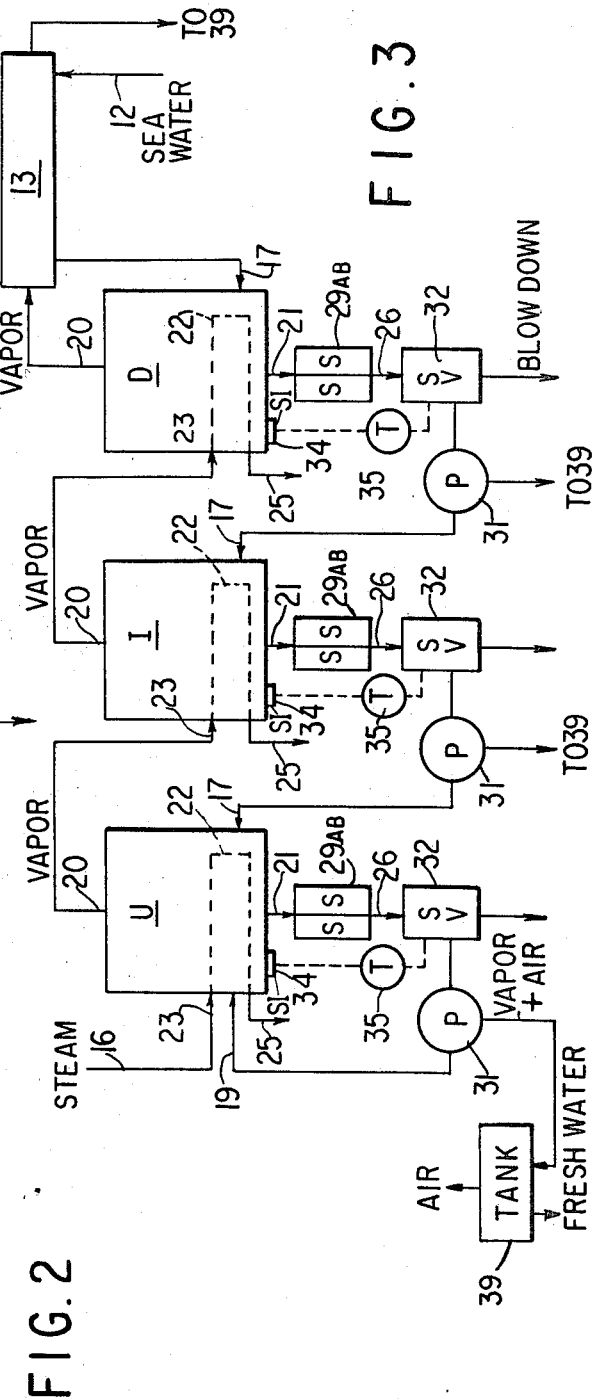
FIG. 3
FIG. 2
INVENTOR
Claude L. Spray
BY
Ernest Obenen
ATTORNEY United States Patent Office 3,402,106
Patented Sept. 17, 1968

ABSTRACT OF THE DISCLOSURE

Heat exchange apparatus for evaporating and concentrating saline water to produce water insoluble salts in the form of scale particles which are removed by straining. The salinity of the concentrate is sensed and the concentrate is blown down when its salinity exceeds a predetermined value. A timer limits blowdown to periodic intervals.

---

The present invention relates to the production of fresh water from salt water taken from the sea, salt water wells and mine waste and, more particularly, to improved heat exchange apparatus and the operation thereof for accomplishing the foregoing.

The present invention is primarily concerned with marine type heat exchangers including but not limited to submerged tube evaporators designed to produce fresh water from salt water and from concentrated salt water containing up to about 75,000 parts per million of dissolved solids.

In the operation of apparatus of this type, the dissolved solids in the water such as certain salts of calcium and magnesium, when concentrated and heated, are rendered insoluble and are precipitated to form a hard scale which clings tenaciously to heat exchange surfaces of the apparatus. As such scale builds up beyond a tolerable thickness, the U-factor of the heat exchange surfaces is greatly reduced whereby the operation of the apparatus becomes highly inefficient and eventually must be shut down for cleaning.

It is known that certain materials when fed with the salt water are effective to maintain such insoluble salts in a flocculent state, whereby the insoluble salts will settle to the bottom of the apparatus as a sand-like mass and will not appreciably scale up the heat exchange surfaces to reduce the U-factor thereof to a point of inefficiency.

However, in the normal operation of such apparatus even with the insoluble scale in a flocculent condition, it has been imperative to frequently blow down the concentrated precipitate containing brine in the apparatus. Such blowdown procedures have been accepted as necessary and have been followed in the past in spite of the resulting poor operating economy due to the waste of a great amount of heat.

Thus, if an excessive amount of brine is blown down there is a needless waste of heat, and on the other hand, if an insufficient amount of brine is blown down, there is an increase in the amount of scale forming and insoluble material accumulated in the evaporator. In either case, the result is poor operating economy.

For example, in the past, double effect submerged tube marine type evaporators, while in operation at one thirty-second sea water feed density, required four gallons of feed water to produce one gallon of fresh water. A single effect arrangement requires six gallons. This means that three or five gallons of heated water are blown down respectively and that the heat put into that water is lost.

In accordance with the present invention, it has been discovered that apparatus in which a flocculent precipitate of insoluble salts is accumulated does not require frequent blowdown, but that the precipitate laden brine can be withdrawn, strained to remove insolubles and then returned to apparatus as solids free hot brine. This is accomplished by continuously circulating the brine and extracting the solids without wasting the heat content of the solids free brine.

It also has been discovered that any pressure drop taking place in withdrawing, straining and returning the brine can be utilized to produce vapors which are condensable to provide fresh water.

It also has been discovered that this can be accomplished in the operation of both single, double and multiple effect evaporators.

It further has been discovered that the operating economy of a single effect evaporator system when so operated will greatly exceed that of a double effect evaporator system operated in the prior conventional manner, whereby a double effect system can be operated with one effect while utilizing the second effect as standby equipment.

Accordingly, an advantage of the foregoing discoveries is that hot brine is not lost by frequent blowdown but is recovered and returned to the heat exchange vessel or system.

Another advantage is that much of the flocculating material is not lost by blowdown but is recirculated to minimize the amount of makeup material required to be fed with the incoming salt water and to increase heat transfer.

Another advantage is that a much greater amount of fresh water and/or steam can be produced with the same heat input to the apparatus.

Another advantage is that the concepts of the present invention can be applied to existing and newly fabricated apparatus.

Another advantage is that the recirculated solid-free brine liquid can be forcibly directed against heat exchange surfaces to minimize scaling thereof.

Another advantage is that provision for periodic blowdown can be made when the brine concentration exceeds a predetermined value.

Another advantage is that the recirculated hot brine can be caused to flash to vapor capable of being condensed to produce fresh water and to separate noncondensable gases therefrom.

Another advantage is that the inventive concept lends itself to manual or automatic operation.

A further advantage is that the foregoing can be accomplished in a simple, practical and economical manner.

Other and further advantages will become apparent from the description about to follow with reference to the drawings wherein:

FIG. 1 is a flow diagram of first and second effect submerged tube evaporators which can be selectively arranged to provide (1) a single effect evaporator and a standby single effect evaporator and (2) a first and second effect evaporator system.

FIG. 2 is a wiring diagram of elements which provide for automatic blowdown control.

FIG. 3 is a simplified schematic flow diagram of a multiple effect evaporator system wherein the effects may be provided with controls such as shown in FIGS. 1 and 2.

FIG. 4 is a key explaining the abbreviated legends.

Referring now in detail to FIG. 1 of the drawings, there is shown a submerged tube evaporator system in accordance with the present invention which generally comprises a first vessel 10, a second vessel 11, a source of sea water 12, a condenser 13 for the vapors produced in the vessels 10 or 11 through which sea water is circulated to pick up heat extracted from the vapors in condensing the same, a supply of a material 14 fed and admixed with the sea water at 15 or before entering the condenser to maintain scale forming sea water insolubles in a flocculent condition, and a source of steam 16. Other conventional appurtenances for such a system are not shown because the present invention is not concerned therewith.

The first vessel 10 has a first inlet 17 connected through a valve 18 to the source of treated sea water 15, a second inlet 19, a steam or vapor outlet 20 and a brine outlet 21. A heat exchange means such as a coil 22 is submerged in the liquid at the bottom of the vessel 10, and has an inlet 23 connected through a valve 24 to the source of steam 16 and has a condensate or spent steam outlet 25. Conduit means 26 connects the brine outlet 21 to the second inlet 19 through valves 27 and 28.

The conduit means 26 has connected therein straining means including dual strainers 29A and 29B alternately connected for flow therethrough by valves 30A, 30B, 30C and 30D to provide a standby trainer while brine solids are removed from the other strainer; pump means 31 for inducing flow of the brine through the strainer means; and a solenoid operated valve 32 for blowing down the vessel 10 when the brine therein exceeds a desired concentration.

In order to control such blowdown, a salinity responsive indicator 34 is connected to the lower zone of the vessel 10 for controlling the solenoid operated valve 32 by a timer 35 which allows blowdown only at predetermined periodic intervals.

For example, as shown in FIG. 2 the indicator 34 closes a switch 36 when the brine in the vessel exceeds the desired concentration, and the timer 35 periodically closes a switch 37 connected in series with the switch 36 and the solenoid 38 of the valve 32, whereby blowdown can take place only when both switches 36 and 37 are closed.

In such a blowdown arrangement, the timer 35 can be set to allow blowdown at intervals when the brine concentration in the vessel 10 might have exceeded the value detectable by the salinity indicator, and to allow blowdown only long enough to reduce the brine concentration to a desired value.

The pump means 31 in recirculating the brine induces a pressure drop through the strainers which may cause hot brine to flash to vapor. Such vapor and gases in the brine can be extracted by utilizing a pump capable of pumping hot liquid, gas and vapor which has one outlet for the liquid and another outlet for the gases and vapor. The pumped brine liquid is returned to the vessel, and the pumped gases and vapor are delivered to a tank 39 wherein the vapor is condensed to provide fresh water and wherein the gases separate from the water and are discharged to atmosphere. The continuous recovery of this flashed vapor and the extraction of gases provide for further economy and efficiency in operating the evaporator.

A suitable pump for so handling brine, air and vapor is presently available, and is known as a "Nash Multi-phase-pump," a registered trademark of The Nash Engineering Company, 200 Park Ave., New York, N.Y. Such pumps may be driven by a motor means which readily lends itself to control by the blowdown arrangement illustrated in FIG. 2.

Alternatively, the strained brine may be caused to flash into a chamber from which vapor and gases are extracted and the brine liquid is pumped and returned to the vessel.

The second vessel 11 also has a first inlet 17 selectively connected through valves 40 and 41 (and the valves 27 and 28) to the source of treated sea water 15 and the brine return conduit means 26 of the first vessel 10, a second inlet 19, a steam or vapor outlet 20 and a brine outlet 21. A heat exchange means such as a coil 22 is submerged in the liquid at the bottom of the vessel 11, and has an inlet 23 selectively connected to the steam source 16 and the vapor outlet 20 of the first vessel 10 by valves 42 and 44 and has a condensate or spent steam outlet 25. Valves 45 and 46 provide for selectively connecting the vapor outlets 20 of the first and second vessels to the condenser 13.

Conduit means 26 connect the brine outlet 21 to the second inlet 19 of the second vessel 11 and have connected therein a strainer, pump and blowdown arrangement identical to that provided for the first vessel 10 with corresponding elements being referenced by the same numerals.

In operation, when the first vessel 10 is utilized as a single effect evaporator and the second vessel 11 is idle or is being repaired, the valves 18, 24, 27, 28, 30A and 30B (or 30C and 30D) and 45 are open; and the valves 30C and 30D (or 30A and 30B), 40, 41, 42, 44 and 46 are closed.

When the second vessel 11 is utilized as a single effect evaporator and the first vessel 10 is idle or is being repaired, the valves 30A and 30B (or 30C and 30D), 40, 41, 42 and 46 are open; and the valves 18, 24, 27, 28, 30C and 30D (or 30A and 30B) of the vessel 11, 44 and 45 are closed.

When the first and second vessels 10 and 11 are utilized as a double effect evaporator, the valves 18, 24, 28, one set of strainer valves of each vessel, 41, 44 and 46 are open; and the valves 27, the other set of strainer valves of each vessel, 40, 42 and 45 are closed.

When the first and second vessels are so connected treated sea water is fed to the first vessel, steam from the source 16 is supplied to the coil 22 of the first vessel, strained brine from the first vessel is fed to the second vessel, brine from the second vessel is withdrawn, strained and reintroduced into the second vessel, vapors from the first vessel are supplied to the coil 22 of the second vessel, and vapors produced by the second vessel are discharged to the condenser 13.

In FIG. 3, a multiple effect heat exchange system is illustrated by way of a simplified schematic flow diagram wherein valves are omitted but certain means, elements and devices similar to those shown in FIGS. 1 and 2 are shown and indicated by like reference numerals.

This system comprises at least three vessels arranged in series and including an upstream vessel U, a downstream vessel D and at least one intermediate vessel I. Upstream and downstream are referenced to the steam supplied to the system.

The upstream vessel has a first water inlet 17, a second water inlet 19, a condensate outlet 21 and a vapor outlet 20. The intermediate and downstream vessels have a feed inlet 17, a condensate outlet 21 and a vapor outlet 20. All of the vessels have heat exchange means 22 therein provided with a heating steam inlet 23 and a spent steam or condensate outlet 25.

A source of heating steam 16 is connected to the upstream vessel heat exchange means inlet 23, and a source of saline water 12 is connected through a condenser 13 to the downstream vessel water inlet 17. The steam outlets 20 of the upstream and intermediate vessel are connected to the inlet of the heat exchange means of the intermediate and downstream vessels, respectively. The steam outlet 20 of the downstream vessel is connected to the condenser 13.

First conduit means 26 connect the downstream vessel water outlet 21 to the intermediate vessel water inlet 17; second conduit means 26 connect the intermediate vessel water outlet 21 to the upstream vessel water inlet 17; and third conduit means 26 connect the upstream vessel water outlet 21 to its water inlet 19.

Each of the conduit means 26 has connected therein in series dual strainers 29AB, a solenoid operated blowdown valve 32 controlled by a salinity indicator 34 and a timer 35 as shown in FIG. 2, and a pump 31 of the type previously described.

In such a system the salinity of the strained brine increases from downstream to upstream, whereby more frequent blowdown of the intermediate and upstream vessels may be required than of the downstream vessel. This is readily accomplished by utilizing indicators 34 and timers 35 in each of the conduit means which are adjusted to effect blowdown as required.

The material hereinbefore mentioned which maintains the undissolved precipitated solids in a flocculent condition may be the juice of any number of plants such as the agave plant and the like which juice has been processed to maintain certain sugars thereof unfermented and to preserve complex amines or other compounds which serve this purpose.

The amount of such materials required to treat the sea water or other saline waters depends upon the dissolved solids contents of the water. For example, when treating raw sea water containing about 32,000 parts per million of dissolved solids, excellent results are attained by using one part of the material at 13° Beaumé for between about 5,000 and about 20,000 parts by volume of such sea water in starting the apparatus, and by thereafter using less of the material as its concentration is built up in the recirculated brine.

While the present invention has been described in connection with sea water, it will be understood that the disclosed apparatus and systems are fully capable of handling water containing lower concentrations of scale forming insolubles. Thus, the terms salt water and saline water are used herein in a broad sense and are intended to include any so called hard feed water which heretofore caused scale forming problems in the operation of conventional heat exchange apparatus and systems.

Also, the term steam is used herein in a broad sense and is intended to include water in the vapor state above and below its boiling point.

From the foregoing description, it will be seen that the present invention provides a novel and useful apparatus for producing fresh water from salt water.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What I claim is:

1. In an evaporating apparatus, a vessel containing saline feed water and a brine mixture containing crystalline solids and having feed and recycle inlets, a vapor outlet and a concentrated brine outlet; indirect heat exchange means in said vessel having a heating steam inlet and an outlet; means for supplying saline feed water to said feed inlet; conduit means connecting said brine outlet and said recycle inlet; strainer means in said conduit means; pump means for inducing the flow of brine from said strainer means and to said recycle inlet; valve controlled blowdown means in said conduit means; a salinity indicator connected to the bottom of said vessel for controlling said blowdown means; and timing means connected to said indicator and said blowdown means for limiting blowdown to periodic intervals.

2. Apparatus according to claim 1, wherein said strainer means is between said brine outlet and said pump means, and said blowdown means is between said pump means and said second inlet.

3. Apparatus according to claim 1, wherein said heat exchange means includes a coil submerged in the feed water and brine mixture, and said recycle inlet is located to direct returned brine against said coil.

4. Apparatus according to claim 1, including means associated with said pump means constructed and arranged to extract vapor and gases from the brine as the brine flashes when subjected to a pressure drop in said strainer means.

5. Apparatus according to claim 4, including means for condensing the extracted vapor and collecting the condensate and allowing gases carried by the extracted vapor to be separated from the condensate.

6. In evaporating apparatus, a first vessel having feed and recycle inlets, a vapor outlet and a concentrated brine outlet; first indirect heat exchange means in said first vessel having an inlet and outlet; first conduit means having a heating medium inlet connected to said brine outlet and having an outlet; first strainer means in said conduit means; pump means in said conduit means for inducing the flow of brine through said strainer means; valve controlled blowdown means in said conduit means; a second vessel having feed and recycle inlets, a vapor outlet and a concentrated brine outlet; second indirect heat exchange means in said second vessel having a heating medium inlet and an outlet; second conduit means having an inlet connected to said second vessel brine outlet and an outlet connected to said second vessel recycle inlet; second strainer means in said second conduit means; pump means in said second conduit means for inducing the flow of brine through said second strainer means; valve controlled blowdown means in said second conduit means; a source of saline feed water; a source of heating steam; valve and conduit means for selectively connecting said feed water source to said first vessel feed inlet and said second vessel feed inlet and for selectively connecting said first conduit means outlet to said first vessel recycle inlet and said second vessel feed inlet; and valve and conduit means for selectively connecting said heating steam source to said first heat exchange means inlet and said second heat exchange means inlet and for selectively connecting said first vessel vapor outlet to a point of discharge and said second heat exchange means inlet, whereby said first and second vessels can be selectively arranged to provide a single effect evaporator and a standby single effect evaporator and to provide a multiple effect evaporation system.

7. In evaporating apparatus, a first vessel having a sea water inlet, a vapor outlet and a concentrated brine outlet; first indirect heat exchange means in said first vessel having a heating steam inlet and an outlet; a second vessel having feed and recycle brine inlets, a brine outlet and a vapor outlet; second indirect heat exchange means in said second vessel having an outlet and a heating medium inlet connected to said first vessel heating steam outlet; first conduit means connecting said first vessel brine outlet to said vessel feed brine inlet; second conduit means connecting said second vessel brine outlet to said second vessel recycle brine inlet; independently operable means connected in each of said conduit means, each of said last mentioned means including strainer means, pump means and valve controlled blowdown means; a salinity indicator connected to the bottom of each of said vessels for controlling said blowdown means; and a timing means connected to each indicator and the blowdown means which the indicator controls for limiting blowdown to periodic intervals.

8. In a multiple evaporator system, the combination of a plurality of vessels arranged in series and including an upstream vessel having feed and recycle liquid water inlets and concentrate and vapor outlets and a downstream vessel having a feed inlet and concentrate and vapor outlets, heat exchanging means in said vessels each having a heating medium inlet and outlet, a source of heating steam connected to said upstream vessel heat exchange means inlet, a source of saline feed liquid connected to said downstream vessel feed liquid inlet, conduit means for delivering vapor generated by said upstream vessel to said downstream vessel heat exchange means inlet, a recycle conduit connecting said upstream vessel water outlet to said downstream vessel to recycle water and liquid water inlet and to said downstream vessel feed inlet, a second conduit connecting said upstream vessel concentrate outlet to said upstream vessel recycle liquid inlet, and said first and second conduits having connected therein means for straining precipitated saline water insolubles, pump means for effecting circulation of strained saline water and means for effecting blowdown of concentrated saline water; a salinity indicator connected to the bottom of each of said vessels for controlling said blowdown means, and a timing means connected to each indicator and the blowdown means which the indicator controls for limiting blowdown to periodic intervals.

9. In a counterflow multiple effect evaporator system, the combination of at least three vessels arranged in series and including an upstream vessel with respect to vapor flow having feed and recycle water inlets and water and steam outlets, a downstream vessel having a water inlet and concentrate and vapor outlets, and at least one intermediate vessel having a feed inlet and concentrate and vapor outlets; indirect heat exchange means in said vessels each having an inlet and an outlet; a source of steam connected to said upstream vessel heat exchange means inlet; a source of saline feed water connected to downstream vessel feed inlet; a conduit connecting said upstream vessel vapor outlet to said intermediate vessel heat exchange means inlet; a conduit connecting said intermediate vessel vapor outlet to said downstream vessel heat exchange means inlet; first conduit means connecting said downstream vessel concentrate outlet to said intermediate vessel feed inlet; second conduit means connecting said intermediate vessel concentrate outlet to said upstream vessel feed water inlet; third conduit means connecting said upstream vessel concentrate outlet to said upstream vessel recycle water inlet; and means connected in series in each of said first, second and third conduit means including means for straining precipitated saline water insolubles, means for effecting blowdown of concentrated saline water, and pump means for circulating strained saline water; a salinity indicator connected to the bottom of each of said vessels for controlling said blowdown means; and a timing means connected to each indicator and the blowdown means which it controls for limiting blowdown to periodic intervals.

References Cited

UNITED STATES PATENTS

| | | | |
|---|---|---|---|
| 2,330,221 | 9/1943 | Kermer | 159—20 |
| 2,485,689 | 10/1949 | Baumann | 159—23 |
| 2,745,484 | 5/1956 | Eckstrom et al. | 159—44 |
| 2,199,216 | 4/1940 | Conti | 159—28 X |
| 2,598,345 | 5/1952 | Brown | 159—44 |
| 2,631,926 | 3/1953 | Eckstrom | 23—273 |
| 2,931,433 | 4/1960 | Mertz | 159—44 X |
| 3,179,159 | 4/1965 | Jafs | 159—47 |
| 3,258,060 | 6/1966 | Chirico | 159—20 |
| 3,102,062 | 8/1963 | Graham et al. | 159—44 X |
| 3,242,867 | 3/1966 | Mosbacker | 103—6 |

NORMAN YUDKOFF, *Primary Examiner.*

J. SOFER, *Assistant Examiner.*